United States Patent
Lian

(10) Patent No.: US 9,993,667 B2
(45) Date of Patent: Jun. 12, 2018

(54) DESCENT CONTROL DEVICE

(71) Applicant: High-Rise Safety Technology Limited, Dongguan, Guangdong Province (CN)

(72) Inventor: Jun Lian, Dongguan (CN)

(73) Assignee: High-Rise Safety Technology Limited, Dongguan (CN)

( * ) Notice: Subject to any disclaimer, the term of this patent is extended or adjusted under 35 U.S.C. 154(b) by 0 days. days.

(21) Appl. No.: 15/366,934

(22) Filed: Dec. 1, 2016

(65) Prior Publication Data
US 2017/0157432 A1    Jun. 8, 2017

(30) Foreign Application Priority Data
Dec. 2, 2015    (CN) ..................... 2015 2 0982840 U

(51) Int. Cl.
| A62B 1/10 | (2006.01) |
| A62B 35/00 | (2006.01) |
| F16H 3/02 | (2006.01) |
| F16H 19/06 | (2006.01) |

(52) U.S. Cl.
CPC .............. *A62B 1/10* (2013.01); *A62B 35/005* (2013.01); *F16H 3/02* (2013.01); *F16H 19/06* (2013.01)

(58) Field of Classification Search
CPC .... A62B 1/00; A62B 1/06; A62B 1/08; A62B 1/10; A62B 35/00; A62B 35/0043; A62B 35/005; A62B 35/0093
USPC ....................................................... 188/65.1
See application file for complete search history.

(56) References Cited

U.S. PATENT DOCUMENTS

| 287,940 | A | * | 11/1883 | Johnson | A62B 1/10 182/231 |
| 1,066,716 | A | * | 7/1913 | Davy | A62B 1/10 182/241 |
| 1,435,366 | A | * | 11/1922 | Abbott | A62B 1/10 182/239 |
| 1,541,590 | A | * | 6/1925 | Ryba | A62B 1/10 182/239 |
| 2,791,397 | A | * | 5/1957 | Coffman | A62B 35/0093 182/239 |
| 2,976,955 | A | * | 3/1961 | Huber | A62B 1/10 182/192 |
| 3,150,744 | A | * | 9/1964 | Fertier | A62B 1/00 182/142 |
| 3,666,239 | A | * | 5/1972 | Koshihara | B66D 1/7405 254/287 |
| 3,907,256 | A | * | 9/1975 | Kankkunen | A62B 1/12 182/238 |
| 4,198,033 | A | * | 4/1980 | de la Messuziere | A62B 35/0093 182/241 |
| 4,511,123 | A | * | 4/1985 | Ostrobrod | A62B 35/0093 182/234 |
| 4,602,699 | A | * | 7/1986 | Matt | A62B 1/10 182/234 |

(Continued)

FOREIGN PATENT DOCUMENTS

| CN | 104800980 A | 7/2015 |
| WO | 2015109745 A | 7/2015 |

*Primary Examiner* — Daniel P Cahn
*Assistant Examiner* — Shiref M Mekhaeil
(74) *Attorney, Agent, or Firm* — Shimokaji IP

(57) ABSTRACT

A descent control device includes a gear train, a speed-control mechanism, a first fastening plate, a second fastening plate and a third fastening plate.

2 Claims, 5 Drawing Sheets

(56) References Cited

U.S. PATENT DOCUMENTS

| | | | | |
|---|---|---|---|---|
| 5,351,906 A * | 10/1994 | Feathers | A62B 1/10 | 182/237 |
| 5,701,972 A * | 12/1997 | Bloder | A62B 1/10 | 182/234 |
| 5,722,612 A * | 3/1998 | Feathers | A62B 35/0093 | 192/103 C |
| 6,279,682 B1 * | 8/2001 | Feathers | A62B 35/0093 | 182/239 |
| 6,810,997 B2 * | 11/2004 | Schreiber | A62B 1/10 | 182/233 |
| 8,052,080 B2 * | 11/2011 | Liang | B66D 5/16 | 242/371 |
| 8,430,207 B2 * | 4/2013 | Griffiths | A62B 1/08 | 182/237 |
| 2006/0096807 A1 * | 5/2006 | Lee | A62B 1/10 | 182/234 |
| 2009/0020373 A1 * | 1/2009 | Kowatsch | A62B 1/08 | 188/65.2 |
| 2009/0084631 A1 * | 4/2009 | Casebolt | A62B 1/10 | 182/235 |
| 2010/0181145 A1 * | 7/2010 | Hobson | A62B 1/10 | 182/234 |
| 2010/0273597 A1 * | 10/2010 | Wilson, Jr. | A62B 1/10 | 475/149 |
| 2010/0308149 A1 * | 12/2010 | Allington | A62B 1/08 | 242/379 |
| 2013/0248291 A1 * | 9/2013 | Jones | A62B 1/10 | 182/241 |
| 2014/0190770 A1 * | 7/2014 | Renton | A62B 1/10 | 182/239 |
| 2014/0299411 A1 * | 10/2014 | Aldred | A62B 1/10 | 182/5 |
| 2014/0318896 A1 * | 10/2014 | Larsson | A62B 1/10 | 182/234 |
| 2015/0352380 A1 * | 12/2015 | Huang | A62B 1/10 | 188/65.3 |

\* cited by examiner

DESCENT CONTROL DEVICE

CROSS-REFERENCES TO RELATED APPLICATIONS

This application claims priority to Chinese patent application No. 201520982840.2 filed on Dec. 2, 2015, disclosure of which is incorporated herein by reference in its entirety.

TECHNICAL FIELD

The present disclosure relates to high-rise fire rescue equipment, especially to a descent control device.

BACKGROUND

The existing descent control devices for fire escape use centrifugal friction mechanism to enable a person to descend at a constant speed. These descent control devices are often out of control, cause casualties and thus have low reliability. The related art also discloses a descent control device with constant speed, which solves the problems of the descent control device with centrifugal fiction mechanism. But this descent control device with constant speed uses a planetary drive wheel train whose gear ratio is low and hard to change. So the force which the slip component is subjected to is large. And the slip component is easy to breakdown first, and the service life of components of the descent control device will not be the same with each other. And it is hard to adjust the decline speed of the human body as needed.

SUMMARY

The application provides a descent control device, the components of the descent control device are even stressed, and the descent control device gear ratio of mechanical gear train is easy to change.

The application provides a descent control device, including a gear train, a speed-control mechanism, a first fastening plate, a second fastening plate and a third fastening plate; wherein the third fastening plate is arranged between the first fastening plate and the second fastening plate; the speed-control mechanism is arranged between the first fastening plate and the third fastening plate; and the gear train is arranged between the second fastening plate and the third fastening plate. Optionally, the speed-control mechanism includes a turret wheel and two slip components.

Optionally, the gear train includes a first-stage gear train and a second-stage gear train; wherein, the first-stage gear train includes a first driving gear and a first driven gear meshing with the first driving gear; and the second-stage gear train includes a second driving gear, a transition gear meshing with the second driving gear and a second driven gear meshing with the transition gear, wherein the second driven gear is fastened on the turret wheel and mounted to the third fastening plate, and the transition gear is fastened between the third fastening plate and a securing piece by the transition gear rotating shaft and riveting; wherein the first driven gear is fastened with the second driving gear, forming a combination gear, the combination gear is mounted onto a first rotating shaft, the first rotating shaft is fixed on the third fastening plate, the third fastening plate is fastened to the first fastening plate by riveting and a rotating shaft of the two slip components; and the first driving gear and the second driven gear are mounted onto a second rotating shaft, the second rotating shaft is fastened between the first fastening plate and the second fastening plate.

Optionally, the first driving gear comprises at least two punching gears fastened together by riveting, an annulus surface with a dedendum circle of the at least two punching gears being an outer ring is a tapered surface tilting toward a center.

DETAILED DESCRIPTION

Figure 1:
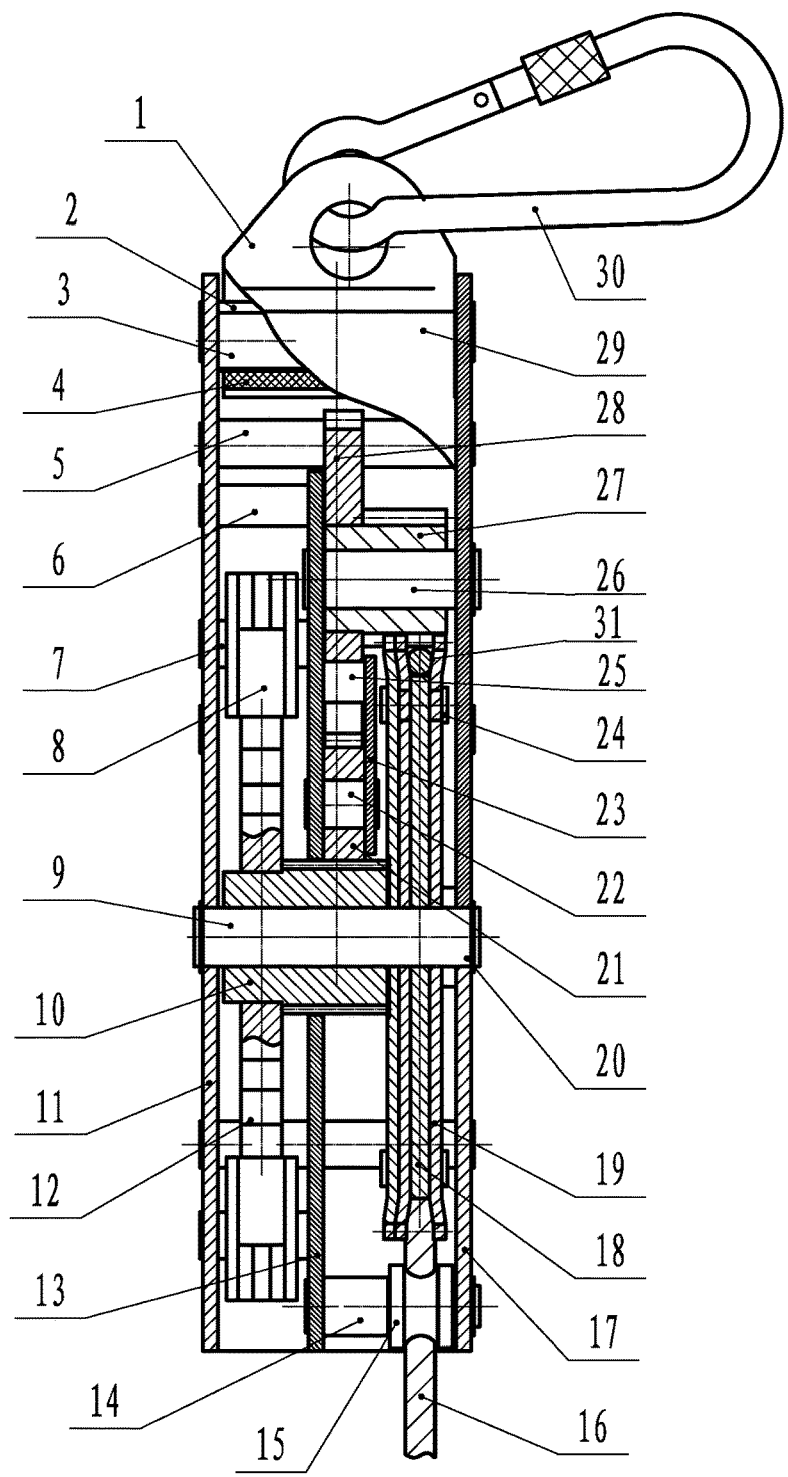
FIG. 1 shows a sectional view of the descent control device according to embodiments of the present application.
Figure 2:
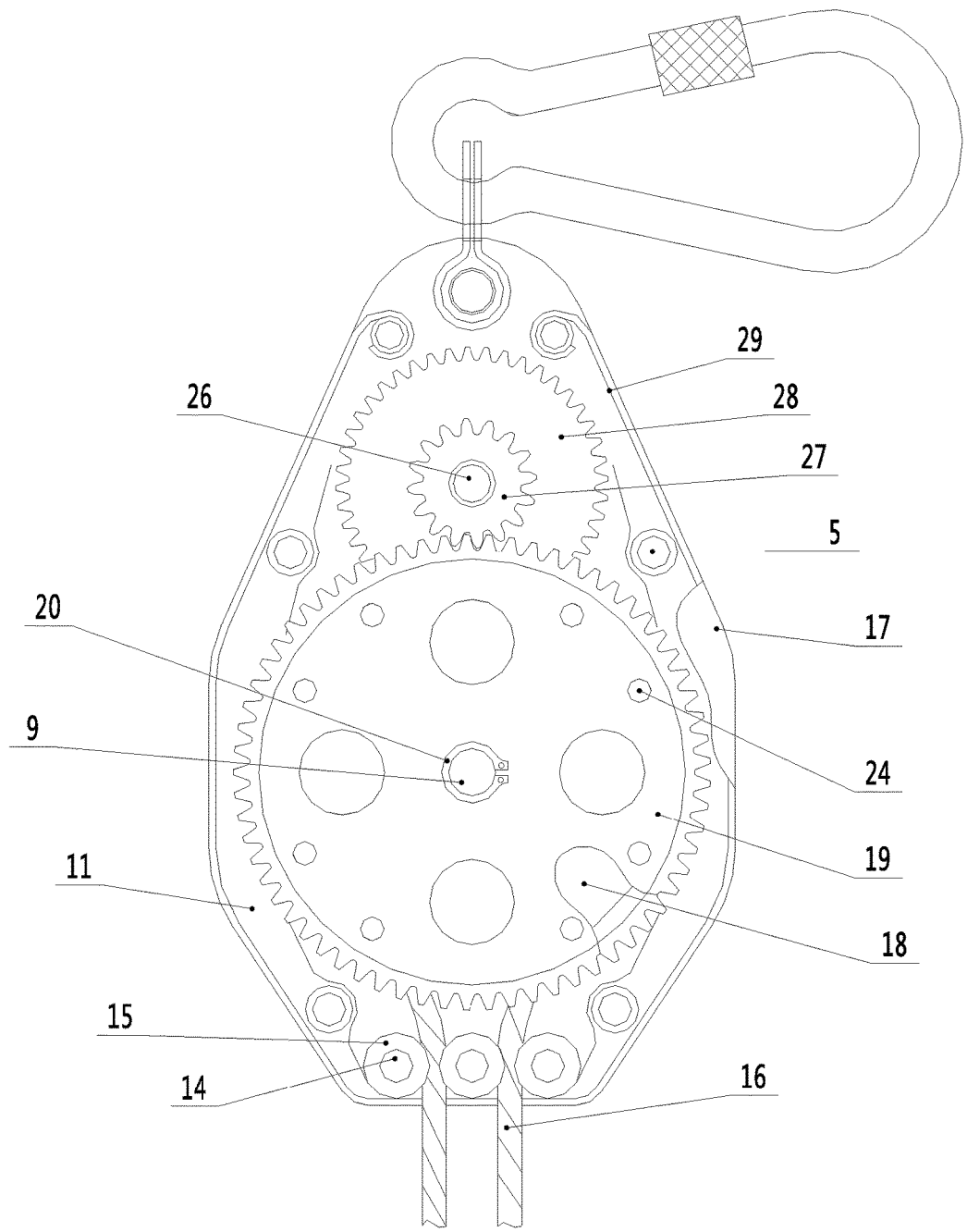
FIG. 2 shows a front view of the descent control device with the second fastening plate removed according to embodiments of the present application.
Figure 3:
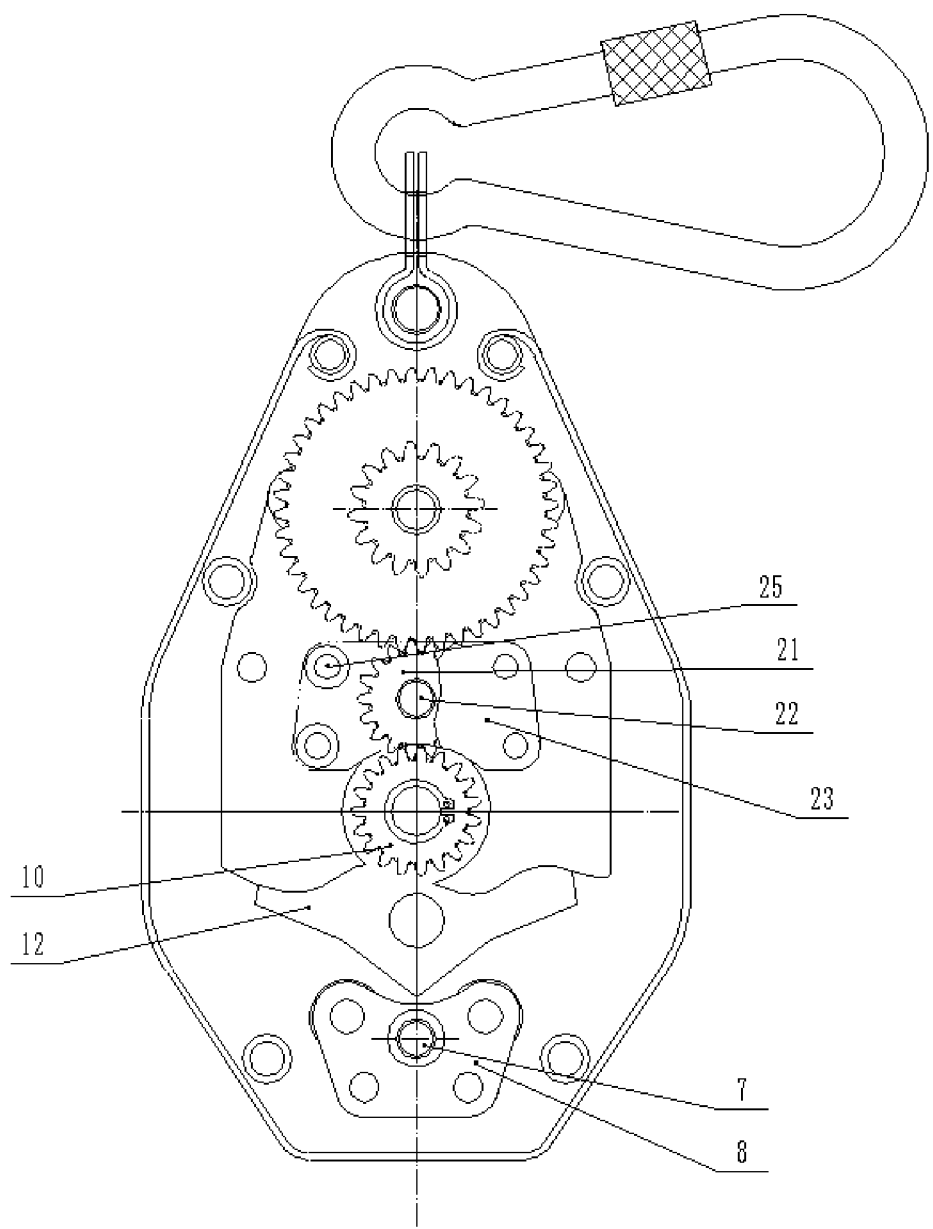
FIG. 3 shows a front view of the descent control device with the driving gear and the third fastening plate removed according to embodiments of the present application.
Figure 4:
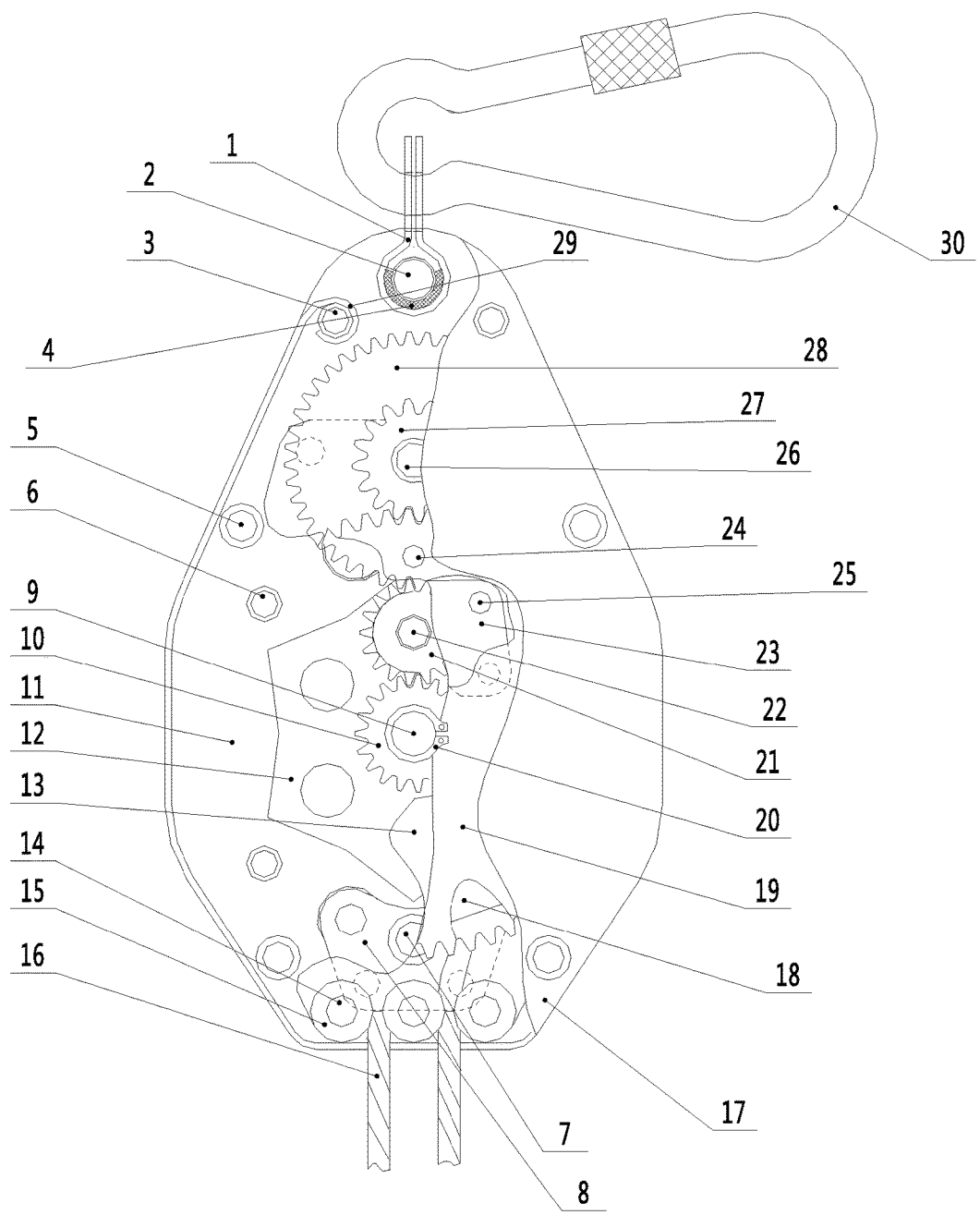
FIG. 4 shows a front assembly drawing of the descent control device according to embodiments of the present application.
Figure 5:
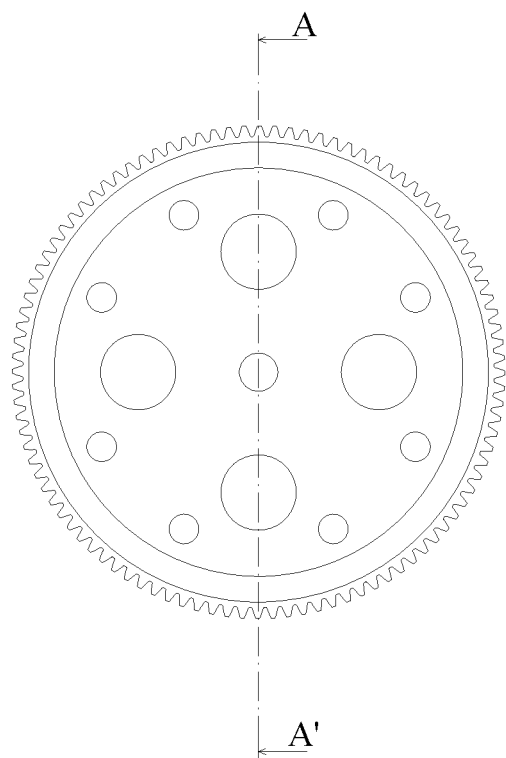
FIG. 5 shows a front view of the punching gear.
Figure 6:
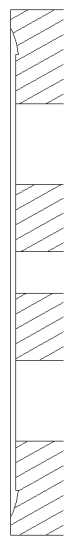
FIG. 6 shows a cross-section view taken along line AA' of FIG. 5.

The embodiments of the present application provide a descent control device, as shown in FIG. 1 to FIG. 6. The descent control device may include a gear train, a speed-control mechanism, a first fastening plate (11), a second fastening plate (17) and a third fastening plate (13), where the third fastening plate (13) is arranged between the first fastening plate (11) and the second fastening plate (17). A hole may be disposed in the third fastening plate (13) for mounting the second driven gear (10). The speed-control mechanism is arranged between the first fastening plate (11) and the third fastening plate (13), and the gear train is arranged between the second fastening plate (17) and the third fastening plate (13). The speed-control mechanism includes a turret wheel (12) and two slip components. Optionally, two slip components are two wheel slip components (8).

The gear train and the speed-control mechanism are respectively positioned and fixed among the three fastening plates, thereby reducing the weight and the volume, and meeting the appearance requirement. The three fastening plates may have a function of descent control device shell.

The gear train may include a first-stage gear train and a second-stage gear train, and a hole may be disposed at the center of each gear in the gear train for mounting the corresponding gear rotating shaft. The first-stage gear train may include a first driving gear (19) and a first driven gear (27) meshing with the first driving gear (19).

The second-stage gear train may include a second driving gear (28), a transition gear (21) meshing with the second driving gear (28) and a second driven gear (10) meshing with the transition gear (21). The second driven gear (10) may be fastened on the turret wheel (12) and mounted to the third fastening plate (13), a hole may be disposed in the third fastening plate (13) for mounting the second driven gear (10), the second driven gear (10) meshes with the transition gear (21) through the third fastening plate (13), and the transition gear (21) is fastened between the third fastening plate (13) and a securing piece (23) by the transition gear rotating shaft (22) and short riveting (25).

The first driven gear (27) may be fastened with the second driving gear (28) forming a combination gear. The first-stage gear train may be connected with the second-stage gear train by the first driven gear (27) and the second driving gear (28).

The combination gear may be mounted onto a first rotating shaft (26). The first rotating shaft (26) may be fixed on the third fastening plate (13), and the third fastening plate (13) may be fastened to the first fastening plate (11) by riveting (6) and the rotating shaft (7) of the two wheel slip components.

The first driving gear (19) and the second driven gear (10) may be mounted onto the second rotating shaft (9). The first driving gear (19) may include at least two punching gears fastened together by riveting. The punching gear may be made by punching a steel plate, and an annulus surface with a dedendum circle of the at least two punching gears being an outer ring is processed as a tapered surface (31) tilting toward the center of the punching gear. At least two punching gears may be fastened together by riveting to form the first driving gear (19), and at least two punching gears form a V-shaped groove when they are relatively assembled, thereby making the first driving gear (19) function as a rope grip gear.

The angle that the tapered surface (31) tilts toward the center of the punching gear may be designed according to the actual situation. Optionally, two pieces of punching gears may be fastened together by riveting (24) to form the first driving gear (19). More than two punching gears may be relatively assembled to form a V-shaped groove so as to enhance the strength of the first driving gear (19). A shim (18) may be placed in the V-shaped groove to form a rope grip gear, and the rope grip gear can be used for clamping the steel wire rope (16) bearing the human body. The steel wire rope (16) bearing the human body may be embed into the V-shaped groove with no slipping. A hole may be disposed at the center of the first driving gear (19) for mounting rotating shaft of the first driving gear.

When the human body slows down, gravity drives the first driving gear (19), then the first driving gear (19) pushes the first driven gear (27) of the combination gear, the first driven gear (27) pushes the second driving gear (28) of the combination gear, the second driving gear (28) drives the transition gear (21), and the transition gear (21) drives the second driven gear (10) with a growth rate. The second driven gear (10) may be fastened on the turret wheel (12), then the turret wheel (12) rotates at a high speed. The rollers of the two wheel slip components (8) (one may be mounted upside of the turret wheel and the other may be mounted downside of the turret wheel) impact the six isosceles triangle wheel angle of the turret wheel (12). Then the two wheel slip components (8) sway around the rotating shaft (7) of the two wheel slip components, thus the rotating speed of the turret wheel (12) is regulated, and the decline rate of the human body is adjusted. By changing the teeth of the transition gear (21) and the teeth of the second driven gear (10), the gear ratio between the transition gear (21) and the second driven gear (10) can be changed, thus the decline rate of the human body can be adjusted.

The first driven gear (27) may be fastened with the second driving gear (28) forming a combination gear, a hole may be arranged at the center of the first driven gear (27) and the second driving gear (28) for mounting rotating shaft. Optionally, the first driven gear (27) may be a pinion and the second driving gear (28) may be a large gear. The combination gear may be mounted onto the first rotating shaft (26). The first end of the first rotating shaft (26) may be fixed on the third fastening plate (13) and the second end of the first rotating shaft (26) may be fixed by the second fastening plate (17) and the snap spring (20) on the side of the second fastening plate (17). A hole may be disposed at the center of the transition gear (21) for mounting the transition gear rotating shaft (22). The transition gear (21) may be fastened between the third fastening plate (13) and a securing piece (23) by the transition gear rotating shaft (22) and short riveting (25). The second driven gear (10) may be fastened on the turret wheel (12), the second driven gear (10) meshes with the transition gear (21) through the hole of the third fastening plate (13). The third fastening plate (13) may be arranged between the first fastening plate (11) and the second fastening plate (17). The third fastening plate (13) may be fastened to the first fastening plate (11) by riveting (6) and rotating shaft (7) of the two wheel slip components. Three roller shafts (14) may be fastened to the downside of the third fastening plate (13). The steel wire rope (16) slides through three rollers with groove (15). The other end of the three roller shafts (14) may be fixed by the second fastening plate (17) and the snap spring (20) on the side of the second fastening plate (17).

A hole may be arranged at the center of the first driving gear (19) and the second driven gear (10) for mounting rotating shaft. The first driving gear (19) and the second driven gear (10) may be mounted onto the second rotating shaft (9), and they rotate around the second rotating shaft (9). The second rotating shaft (9) penetrates through the third fastening plate (13), and the both ends of the second rotating shaft (9) may be fixed by the first fastening plate (11), the second fastening plate (17) and the snap spring (20) on the side of the second fastening plate (17).

Optionally, the gear ratio between the transition gear (21) and the second driven gear (10) can be changed by changing the teeth of the transition gear (21) and the teeth of the second driven gear (10) and by changing the position of the hole through which the second rotating shaft (9) penetrates in the third fastening plate (13). Thus the decline rate of the human body can be adjusted without changing other structural components.

The first fastening plate (11) and the second fastening plate (17) may be fastened by large riveting (5), functioning as descent control device shell. A side plate (29) may surround the first fastening plate (11) and the second fastening plate (17). A bearing column (2) may be arranged at the upside of the first fastening plate (11) and the upside of the second fastening plate (17). A tubular piece (1) may surround the bearing column (2). A locating rod (3) may be inserted into the tubular piece (1). The both ends of the locating rod (3) may be inserted into the openings of the first fastening plate (11) and the second fastening plate (17) to locate. A buffer rubber sheet (4) may be arranged in the tubular piece (1) in order to reduce the impact when human body slows down. The upper end of the tubular piece (1) may be provided with an opening. A spring hook (30) passes through the opening of the tubular piece (1). The spring hook (30) may be used to fix the descent control device.

The embodiments of the present application provide a descent control device, the descent control device has two stage gear trains. The teeth of the transition gear and the teeth of the second driven gear can be changed anytime. And the position of the hole through which the second rotating shaft penetrates in the third fastening plate can also be changed anytime. So the gear ratio between the first-stage gear train and the second-stage gear train can be changed. Thus the decline rate of the descent control device can be adjusted without changing other structural components. The descent control device can bring conveniences to the use with different requirements. The two slip components and the other components of the descent control device are even stressed. Thus the operating life of the descent control device can be improved. Besides, the production cost of the descent control device is low. And the descent control device is water proof, light weight and small size.

What is claimed is:

1. A descent control device, comprising a gear train, a speed-control mechanism, a first fastening plate, a second fastening plate and a third fastening plate; wherein the third fastening plate is arranged between the first fastening plate and the second fastening plate; the speed-control mechanism is arranged between the first fastening plate and the third fastening plate; and the gear train is arranged between the second fastening plate and the third fastening plate;

wherein the speed-control mechanism comprises a turret wheel and two slip components; the gear train comprises a first-stage gear train and a second-stage gear train, the first-stage gear train comprises a first driving gear and a first driven gear meshing with the first driving gear; and the second-stage gear train comprises a second driving gear, a transition gear meshing with the second driving gear and a second driven gear meshing with the transition gear, wherein the second driven gear is fastened on the turret wheel and mounted to the third fastening plate, and the transition gear is fastened between the third fastening plate and a securing piece by a transition gear rotating shaft and a first rivet; wherein the first driven gear is fastened with the second driving gear, forming a combination gear, the combination gear is mounted onto a first rotating shaft, the first rotating shaft is fixed on the third fastening plate, the third fastening plate is fastened to the first fastening plate by a second rivet and a rotating shaft of each of the two slip components; and the first driving gear and the second driven gear are mounted onto a second rotating shaft, the second rotating shaft is fastened between the first fastening plate and the second fastening plate.

2. The descent control device according to claim 1, wherein the first driving gear comprises at least two punching gears fastened together by riveting a third rivet, a dedendum circle of the at least two punching gears has a tapered surface tilting towards a center of each punching gear.

* * * * *